Oct. 13, 1959     H. J. LOFTIS     2,908,457

MOTOR MOUNTING

Filed Nov. 29, 1956

INVENTOR.
HOMER J. LOFTIS
BY
HIS ATTORNEYS

United States Patent Office 2,908,457
Patented Oct. 13, 1959

2,908,457

MOTOR MOUNTING

Homer J. Loftis, Ironton, Ohio, assignor to Henrite Products Corporation, a corporation of Ohio Application November 29, 1956, Serial No. 625,158

2 Claims. (Cl. 248—26)

This invention relates to a motor mounting, and more particularly to a resilient motor mounting wherein the motor itself is separated from the base or cradle which supports the motor by elastomeric material, although not necessarily so limited.

The motor mounting which is the subject of this invention is of the type disclosed in my copending applications for a Resilient Mounting, Serial Number 567,522, filed February 24, 1956, and for a Motor Mounting, Serial Number 625,157, filed November 29, 1956.

An object of this invention is to provide an improved resilient motor mounting wherein the conventional resilient mounting ring normally engageable with the hub of the motor and detachable from the supporting cradle is replaced by a resilient clamping means for engaging the hub of the motor, which clamping means is permanently secured to a detachable portion of the supporting cradle.

Another object of this invention is to provide a resilient mounting for a motor which may be fabricated from spring steel wire parts bonded together with an elastomer without costly machining.

Another object of this invention is to provide a resilient motor mounting wherein a reduced number of parts is employed and wherein assembly is easily and economically accomplished.

Other objects and advantages reside in the construction of parts, the combination thereof, the method of manufacture and the mode of operation, as will become more apparent from the following description.

Figure 1:
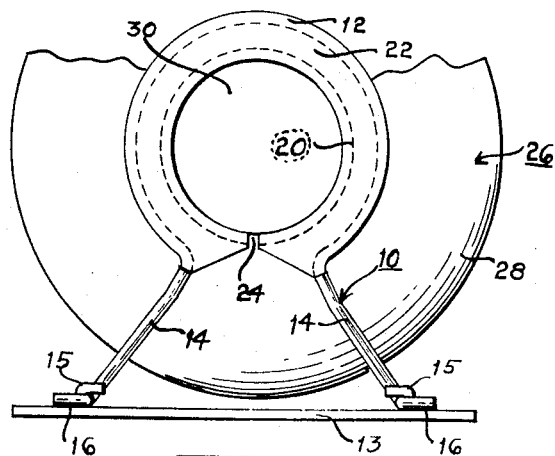

In the drawing, Figure 1 is a fragmentary front elevational view illustrating the present invention with the resilient motor mounting attached to an electric motor.

Figure 2:
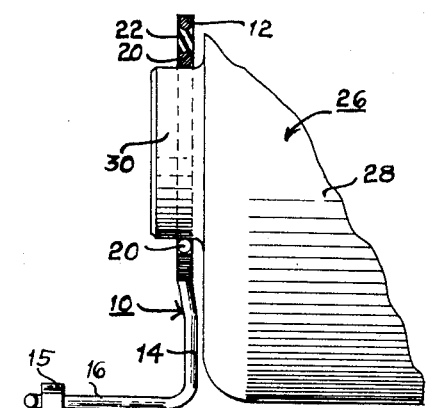

Figure 2 is a fragmentary side elevational view of the resilient mounting of Figure 1, with parts shown in section.

Referring to the drawing in detail, the motor mounting as illustrated is assembled upon a supporting member 10 fabricated from spring metal rod stock, formed to provide a ring segment 12 and suitable legs 14 extending at an acute angle one with respect to another outwardly from and substantially coplanar with the ring segment. Suitable foot portions 16 projecting normally from the legs 12 are provided for anchoring the supporting member 10 to a base 13. Preferably, the foot portions 16 are secured by struck out tongue portions 15 of the base in such a manner that the legs 14 are squeezed one toward the other to create a spring tension tending to reduce the diameter of the ring segment 12.

The use of the supporting member 10 as a motor mounting, without the improved resilient clamping means to be described subsequently, is recognized as old in the art. When the member 10 alone is used as a motor mounting, the ring segment 12 is clamped directly to the hub of the motor, or over an elastomeric ring encircling the hub of the motor, applying a tension in the legs 14 in the aforesaid manner. Ordinarily, one supporting member 10 is secured to the hub at each end of the motor while the foot portions 16 may project away from the motor, as shown in Figure 2, or they may project under the motor when compactness is desired.

Such a mounting is objectionable, in that it makes insufficient allowance for vibratory motion of the motor. The present invention obviates this difficulty by providing a resilient clamping means for engaging the motor, which clamping means operates to absorb and damp the vibratory motion of the motor.

The improved mounting, which is assembled upon the supporting member 10, comprises an inner split spring ring clamp 20, supported in spaced concentric relation to the outer ring segment 12 of the supporting member 10 by an elastomeric ring segment 22. As shown in Figure 1, the elastomeric ring segment 22 envelops both the outer ring segment 12 and the inner clamp 20 and occupies the annular space therebetween. In fabricating the mounting, the elastomeric element 22 may be molded upon the supporting member 10 and the clamp 20, the elastomeric material being bonded to both the ring segment 12 and the clamp 20. As best seen in Figure 1, the elastomer is excluded from the gap 24 in the clamp 20 to facilitate expansion and contraction of the clamp. The elastomer may be synthetic rubber, or any other resilient material having similar properties.

The improved mounting is illustrated in the drawing in association with an electric motor 26, having a cylindrical stator element 28, to each end of which is attached a hub 30, the hub functioning to provide journals for the armature of the motor. It is to be understood, however, that the mounting described herein, may be employed, after suitable modification, in supporting other objects than the electric motor specifically illustrated.

In mounting the motor, a supporting member, as shown in Figures 1 and 2, is assembled upon each hub 30 of the motor by expanding the split spring ring clamps 20, projecting the clamps onto the hubs 30, then permitting the clamps to contract upon the hubs. The legs 14 may then be attached to a suitable base, not shown, in the manner described hereinbefore. When a motor so mounted is operated, the elastomeric ring segment 22 permits damped vibratory motion of the motor independent of the supporting elements and further, during periods of rapid torque change, as during starting and stopping, the elastomeric element yields to permit slight rotary motion of the stator element 28 reducing the impact of the sudden change in torque upon the load and the motor support.

The resiliency of the mounting may be adjusted by varying the radius difference between the outer ring segment 12 and the clamp 20, or by providing suitable recesses or pockets in the elastomeric element 22, or by varying the physical properties of the elastomeric material.

Although the preferred embodiment of the device has been described, it will be understod that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A resilient motor mounting comprising a supporting member comprising a spring metal rod formed into a ring segment having leg portions projecting substantially radially outwardly from the ends thereof, said leg portions providing means for attachment of said ring segment to a base portion, an inner split ring clamp formed of spring metal rod stock disposed within said outer ring segment in concentric coplanar relation thereto, said split ring clamp being engageable with the hub of an electric motor or the like, and an elastomeric ring segment interposed between and bonded to said inner split ring clamp and said outer ring segment, said elastomeric ring segment enveloping the ring segment of said supporting member and said split ring clamp, there being an open portion between the ends of said elastomeric ring segment in alignment with the split portion of said clamp.

2. A resilient motor mounting comprising a supporting member including an outer spring metal ring segment and leg portions projecting substantially radially outwardly from the ends of said ring segment and forming an acute angle one with the other, said leg portions providing means for attachment of said ring segment to a base portion, an inner split ring clamp disposed within said outer ring segment in concentric coplanar relation thereto, said split ring clamp being engageable with the hub of an electric motor or the like, and an elastomeric ring segment interposed between and bonded to said inner split ring clamp and said outer ring segment, said elastomeric ring segment surrounding more than one-half the circumference of said split ring clamp, there being an open portion between the ends of said elastomeric ring segment in alignment with the split portion of said clamp.

References Cited in the file of this patent

UNITED STATES PATENTS

| | | |
|---|---|---|
| 2,044,385 | Geyer | June 16, 1936 |
| 2,291,148 | Carson | July 28, 1942 |
| 2,591,669 | Bucknell | Apr. 8, 1952 |
| 2,842,218 | Bradbury | July 8, 1958 |